(12) United States Patent
Balasubramanian et al.

(10) Patent No.: US 8,793,645 B2
(45) Date of Patent: Jul. 29, 2014

(54) REPLACEMENT OF DATA ELEMENT IN A GRAPH

(75) Inventors: Ramrajprabu Balasubramanian, Renton, WA (US); Kushal Shah, Redmond, WA (US); Balasubramanian Shyamsunder, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 917 days.

(21) Appl. No.: 12/753,695

(22) Filed: Apr. 2, 2010

(65) Prior Publication Data

US 2011/0246872 A1 Oct. 6, 2011

(51) Int. Cl.
*G06F 9/44* (2006.01)

(52) U.S. Cl.
USPC .......................................... 717/104

(58) Field of Classification Search
None
See application file for complete search history.

(56) References Cited

U.S. PATENT DOCUMENTS

| | | | |
|---|---|---|---|
| 4,918,621 A | 4/1990 | Nado et al. | |
| 5,617,568 A | 4/1997 | Ault et al. | |
| 5,917,492 A | 6/1999 | Bereiter et al. | |
| 6,209,036 B1 | 3/2001 | Aldres et al. | |
| 6,625,604 B2 | 9/2003 | Muntz et al. | |
| 6,633,869 B1 * | 10/2003 | Duparcmeur et al. | 1/1 |
| 6,789,204 B2 | 9/2004 | Abdelnur et al. | |
| 6,925,515 B2 | 8/2005 | Burns et al. | |
| 7,043,485 B2 | 5/2006 | Manley et al. | |
| 7,162,488 B2 | 1/2007 | DeVorchik et al. | |
| 7,240,114 B2 | 7/2007 | Karamanolis et al. | |
| 7,587,483 B1 * | 9/2009 | Florissi et al. | 709/223 |
| 7,631,291 B2 * | 12/2009 | Shukla et al. | 717/107 |
| 7,788,238 B2 * | 8/2010 | Gabriel et al. | 707/695 |
| 7,818,690 B2 | 10/2010 | Srivastava | |
| 7,930,648 B1 | 4/2011 | Jaramillo | |
| 8,316,323 B2 | 11/2012 | Sariaiya et al. | |
| 8,452,821 B2 | 5/2013 | Shankar | |
| 2001/0032320 A1 | 10/2001 | Abdelnur et al. | |

(Continued)

FOREIGN PATENT DOCUMENTS

| | | |
|---|---|---|
| JP | 5-265829 | 10/1993 |
| JP | 7-210443 | 8/1995 |

(Continued)

OTHER PUBLICATIONS

Implementing Dynamic Flexibility in Workflows using Worklets—Published Date: 2006 http://www.yawlfoundation.org/documents/Implementing%20Worklets.pdf (22 pages).

(Continued)

*Primary Examiner* — Don Wong
*Assistant Examiner* — Daxin Wu
(74) *Attorney, Agent, or Firm* — Ben Tabor; Brian Haslam; Micky Minhas (57) ABSTRACT

The generation and/or use of a hierarchical structure of model elements such as those that might be portions of a computer program. If it is determined that if a particular one of the model elements should be changed from one model element type to another model element type, that change is automatically made. The determination of whether the change should be made may be based on monitoring of actual behavior of the software program. The determination might alternatively be made based on expressed gestures of an author using an authoring program that visualizes the hierarchical structure of model elements.

20 Claims, 8 Drawing Sheets

(56) References Cited

U.S. PATENT DOCUMENTS

| | | | |
|---|---|---|---|
| 2003/0188292 | A1* | 10/2003 | Herkert .................. 717/105 |
| 2004/0034497 | A1 | 2/2004 | Shah et al. |
| 2004/0205143 | A1 | 10/2004 | Uemura |
| 2004/0205711 | A1 | 10/2004 | Ishimitsu et al. |
| 2005/0132304 | A1 | 6/2005 | Guido et al. |
| 2006/0053147 | A1 | 3/2006 | Wahlert et al. |
| 2006/0053178 | A1 | 3/2006 | van Ingen et al. |
| 2006/0085428 | A1 | 4/2006 | Bozeman et al. |
| 2006/0173956 | A1 | 8/2006 | Ulrich et al. |
| 2006/0242197 | A1* | 10/2006 | Tsyganskiy et al. ...... 707/103 Y |
| 2007/0006468 | A1 | 1/2007 | Davies et al. |
| 2007/0022087 | A1 | 1/2007 | Bahar et al. |
| 2007/0088669 | A1 | 4/2007 | McGuire et al. |
| 2007/0094354 | A1 | 4/2007 | Soltis |
| 2007/0234224 | A1 | 10/2007 | Leavitt et al. |
| 2007/0250505 | A1 | 10/2007 | Yang et al. |
| 2008/0098016 | A1* | 4/2008 | Sasai et al. .................. 707/100 |
| 2008/0256508 | A1 | 10/2008 | Jonsson |
| 2008/0270933 | A1 | 10/2008 | Straw et al. |
| 2008/0282189 | A1 | 11/2008 | Hofmann et al. |
| 2008/0301658 | A1* | 12/2008 | El-Kersh .................. 717/165 |
| 2009/0006154 | A1 | 1/2009 | Hao et al. |
| 2009/0006468 | A1* | 1/2009 | Shankar et al. ........... 707/103 Y |
| 2009/0007063 | A1 | 1/2009 | Szpak et al. |
| 2009/0063547 | A1 | 3/2009 | Wright et al. |
| 2009/0100405 | A1* | 4/2009 | Belenky et al. ............... 717/104 |
| 2009/0106238 | A1 | 4/2009 | Lita et al. |
| 2009/0125877 | A1* | 5/2009 | Kuzsma et al. ............. 717/105 |
| 2009/0164939 | A1 | 6/2009 | Ishimitsu et al. |
| 2009/0222547 | A1 | 9/2009 | Boylan et al. |
| 2009/0300326 | A1 | 12/2009 | Sweeney |
| 2009/0300579 | A1* | 12/2009 | Dutta et al. .................. 717/105 |
| 2010/0049766 | A1 | 2/2010 | Sweeney et al. |
| 2010/0287528 | A1* | 11/2010 | Lochmann .................. 717/104 |
| 2010/0313179 | A1* | 12/2010 | Groves et al. ................ 717/101 |
| 2011/0145690 | A1 | 6/2011 | Hofmann et al. |

FOREIGN PATENT DOCUMENTS

| | | |
|---|---|---|
| JP | 11/15722 | 1/1999 |
| JP | 2004240803 | 8/2004 |
| WO | WO 2004042618 | 5/2004 |

OTHER PUBLICATIONS

Enhancing the Flexibility of Workflow Execution by Activity Anticipation—Published Date: 2006 http://www.prism.uvsq.fr/~grig/These/IJBPIM.pdf (13 pages).

Enhancing the Fault Tolerance of Workflow Management Systems—Published Date: 2000 http://ieeexplore.ieee.org/stamp/stamp.jsp?arnumber=00865896 (8 pages).

Windows Workflow Foundation: Creating a Custom Composite Activity—Published Date: Jan. 2006 http://msdn.microsoft.com/en-us/library/aa480200.aspx (15 pages).

ActivityFlow: Towards Incremental Specification and Flexible Coordination of Workflow Activities—Published Date: 1997 http://www.springerlink.com/content/52j5165w884718k3/fulltext.pdf (14 pages).

Kushal Shah—Workflows—Retrieved Date: Feb. 1, 2010 http://blogs.msdn.com/kushals/archive/2009/11/11/morphing.aspx (2 pages).

Navigation Fast Pack User Guide—Published Date: 2009; http://download.softpress.com/downloads/Navigation_Pack_User_ Guide.pdf (28 pages) (The month of Publication is irrelevant since the year of Publication is clearly prior to the filing of the Application).

"Are SharePoint Breadcrumbs completely wrong?" Published Date: May 2, 2008; http://www.novolocus.com/tag/breadcrumbs/ (11 pages).

"ShearerSite Template System"—Published Date: Apr. 19, 2008; http://www.shearersoftware.com/software/web-tools/ShearerSite/ (3 pages).

"Navigation in School Atlases: Functionality, Design, and Implementation in the 'Swiss World Atlas Interactive'"—Published Date: 2009; http://www.schweizerwelfatlast.ch/downloads/publikationen/2009_icc-1.pdf, 10 pages. (The month of Publication is irrelevant since the year of Publication is clearly prior to the filing of the Application).

"Manage Sites and Site Collections"—Available at least as early as: Jan. 27, 2010; http://www.nirma.org/_layouts/help.aspx?Icid=1033&cid0=MS.WSS.manifest&tid=MS.WSS.HA10157781, (5 pages).

U.S. Appl. No. 12/748,110, Apr. 18, 2012, Office Action.

U.S. Appl. No. 12/748,110, Aug. 3, 2012, Notice of Allowance.

Dhruba Borthakur, "The Hadoop Distributed File System: Architecture and Design" http://lucene.apache.org/hadoop/hdfs_design.pdf, Available as early as Jul. 19, 2007.

Kevin Fu et al., "Fast and Secure Distributed Read-Only File System", Feb. 2002, http:delivery.acm.org/10.1145/510000/505453/p1-fu.pdf?keyI=505453&key2=4653284811&coll=GUIDE&dl=GUIDE&CFID=28875249&CFTOKEN=90749616.

Kiron Vijayasankar, "File System and Storage Integrity", http://www.fsi.cs.sunysb.edu/~kvijayas/FILE%20system%and%20Storage%20Integrity.pdf Available as early as Jul. 19, 2007.

Mitsuo Koikawa, "Web Technology in the Era of 2000, Special Version: The First Round", Visual Basic Magazine, vol. 6, No. 10, pp. 298-306, Shoeisha. Co., Ltd, Japan, Aug. 1, 2000.

U.S. Appl. No. 12/013,284, Mar. 18, 2010, Office Action.

U.S. Appl. No. 12/013,284, Aug. 18, 2010, Office Action.

U.S. Appl. No. 12/013,284, Mar. 30, 2011, Office Action.

U.S. Appl. No. 12/013,284, Jul. 9, 2012, Office Action.

U.S. Appl. No. 12/013,284, Oct. 2, 2012, Notice of Allowance.

U.S. Appl. No. 12/013,284, Feb. 6, 2013, Notice of Allowance.

* cited by examiner

REPLACEMENT OF DATA ELEMENT IN A GRAPH

BACKGROUND

Documents are often drafted in a hierarchically structured way in which portions of the document represents nodes in a hierarchy, and there is some convention for recognizing inter-relationships between the nodes. Organization into some hierarchical structure is helpful as it enables data to be more effectively organized and identified within the document. That is one of the driving motivations for the development of eXtensible Markup Language or XML. As an example, there have even been standards for the definition of application programs based on hierarchically structured documents. One such standard is referred to as eXtensible Application Markup Language (XAML).

However, such hierarchically structured documents can become quite complex and cumbersome to deal with as the number of nodes in the hierarchy increase. However, increased nodes are often required to deal with complex data such as, for example, a complex XAML document that describes a sophisticated software program.

BRIEF SUMMARY

At least one embodiment described herein relates to the generation and/or use of a hierarchical structure of model elements. In one embodiment, the model elements may be components of a computer program. If it is determined that if a particular one of the model elements should be changed from one model element type to another model element type, that change is automatically made.

As an example, based on the actual usage of the computer program, it may be determined that one of the model elements of one particular type should be replaced by another model element of another type that is more suited towards the actual usage of the computer program. Based on this determination, the computer program is then modified accordingly automatically.

As another example, the author of a computer program may decide to replace one model element of a particular type with another. Using one or more simple gestures, the author may manipulate a visualization of the hierarchical structure of model elements. In response, the system underlying the visualization may automatically replace the model element while preserving the position of the model element in the hierarchical structure.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a hierarchical structure of model elements is modified. The model elements may be, for example, portions of a computer program. If it is determined that if a particular one of the model elements should be changed from one model element type to another model element type, that change is automatically made. The determination of whether the change should be made may be based on monitoring of actual behavior of the software program. The determination might alternatively be made based on expressed gestures of an author using an authoring program that visualizes the hierarchical structure of model elements. First, some introductory discussion regarding computing systems will be described with respect to FIG. 1. Then, the embodiments in which a hierarchical structure is modified will be described with respect to FIGS. 2 through 8.

Figure 1:
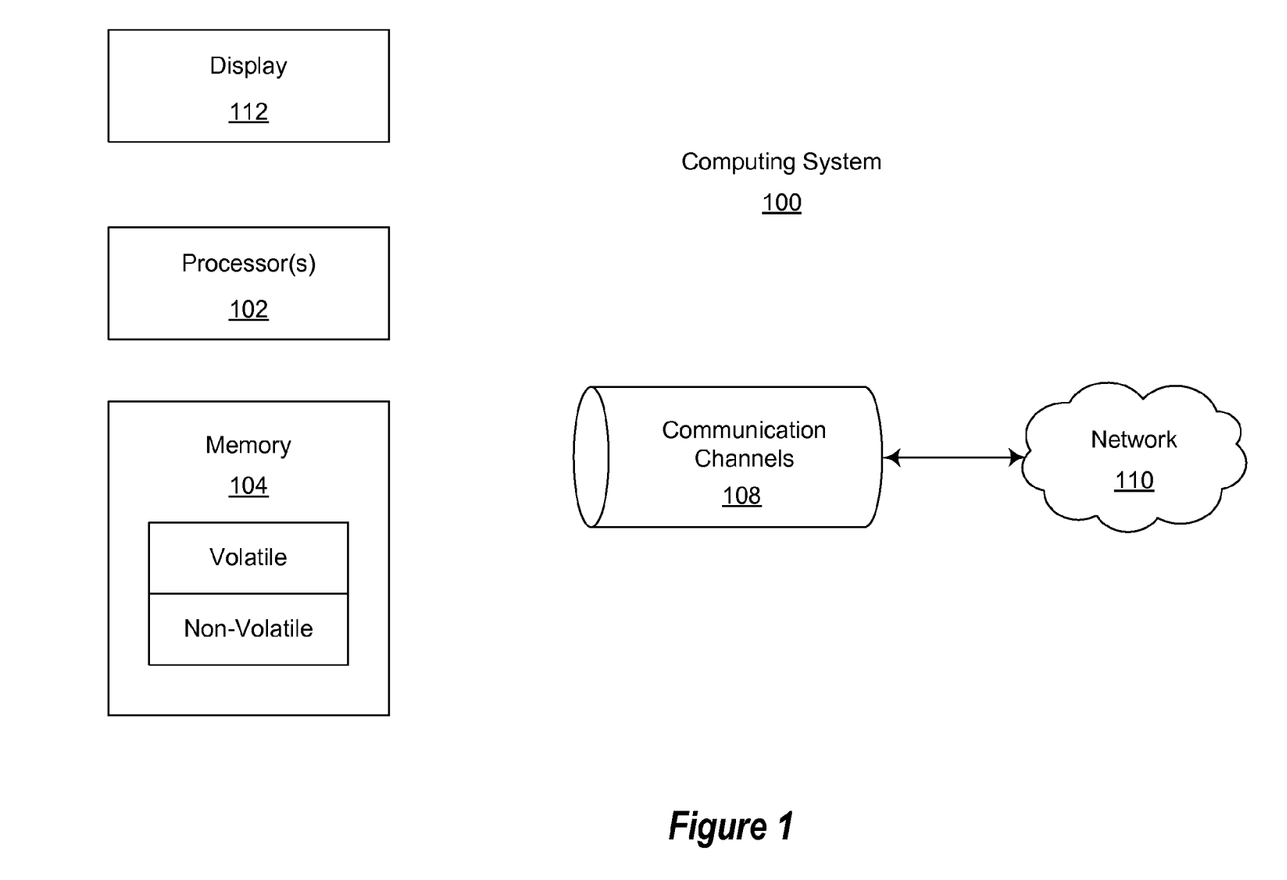
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media (e.g., physical storage devices, which are separate from and do not include wireless media or signals, as discussed below in connection with the term communications media, which does). If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. The computing system 100 also may include a display 112 that may be used to provide various concrete user interfaces, such as those described herein.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media (e.g., physical storage devices that do not include wireless media or signals), and communications media. Physical storage media (devices) and communications media are thus distinct and separate kinds of media, as noted.

Embodiments within the scope of the present invention also include a computer program product having computer-readable media for carrying or having computer-executable instructions or data structures stored thereon. Such computer-readable media (or machine-readable media) can be any available media that can be accessed by a general purpose or special purpose computer. By way of example, and not limitation, such computer-readable media can comprise physical storage media such as RAM, ROM, EEPROM, CD-ROM, DVD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims. The computer-executable instructions cause the computer or processing device to perform the function or group of functions because the computer-executable instructions have a certain structure. If digitally represented, for example, such structures may represent one or more bits of information. In the case of magnetic storage media, for example, such a structure may be a level and/or orientation of magnetism on the media at predetermined parts of the magnetic storage media. In the case of optical storage media, for example, such a structure may be a level of reflectivity of the media at particular predetermined parts of the optical media.

The computing system 100 may execute viewer/editor such as that to be described further herein. The computing system 100 may also have access to hierarchically structured documents such as the example document described further herein.

Figure 2:
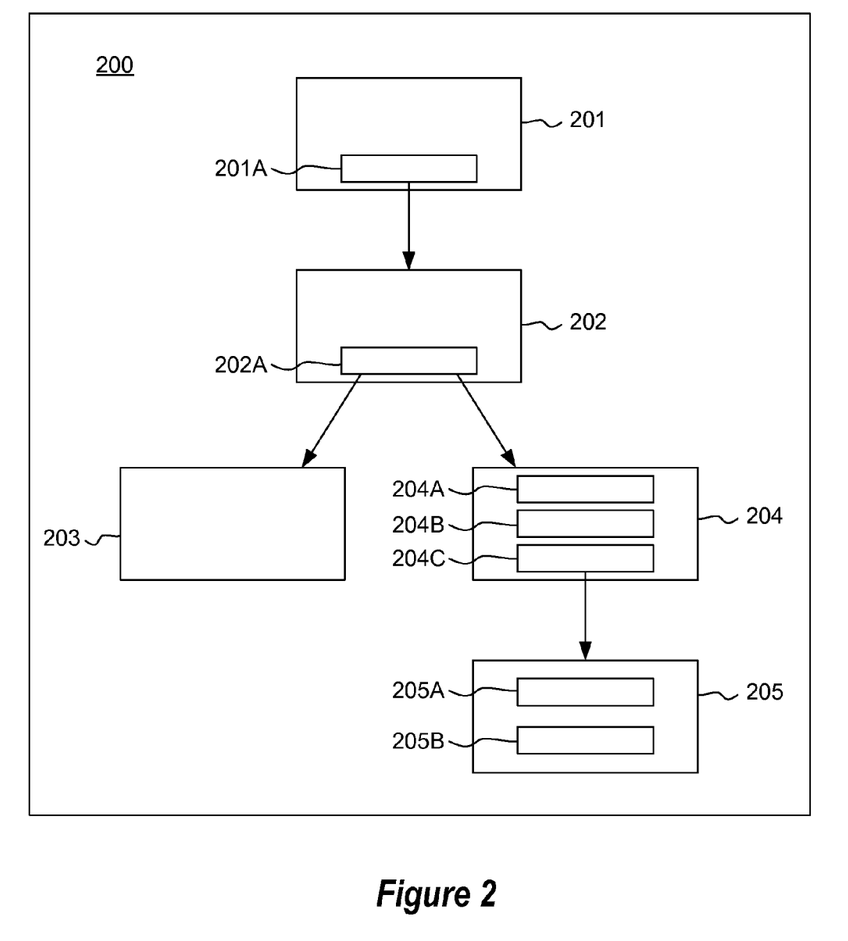
FIG. 2 abstractly illustrates an example hierarchically structured document that may be viewed by the viewer in accordance with the principles described herein.

FIG. 2 abstractly illustrates a hierarchically structured document 200 that represents a certain hierarchy of nodes. The hierarchically structured document 200 is just a simple example in which there are four nodes in the hierarchy, including parent node 201, and child nodes 202 through 205. However, the principles described herein may apply to any hierarchy, even complex hierarchies of hundreds or thousands of nodes.

Although not required, each of the nodes may have zero or more fields. For instance, node 201 contains field 201A; node 202 contains field 202A; node 203 has no fields; node 204 has three fields 204A, 204B, and 204C; and node 205 has two fields 205A and 205B. In this example, field 201A is a body field of node 201 and is defined as including node 202. Likewise, node 202A is a body field of node 202 and is defined as including nodes 203 and 204. Finally, node 204C is a body field of node 204 and is defined as including node 205. Thus, some fields define relationships with one or more child nodes. Other fields define parameters of the node. For instance, fields 204A and 204B define properties of the node 204, and node 205A defines a property for node 205. Field 205B may be a body field for node 205 and thus may be used to add a child node relation to the node 205. Furthermore, body fields 201A, 202A and 204C may be further used to add additional child nodes for respective nodes 201, 202 and 204.

Figure 3:
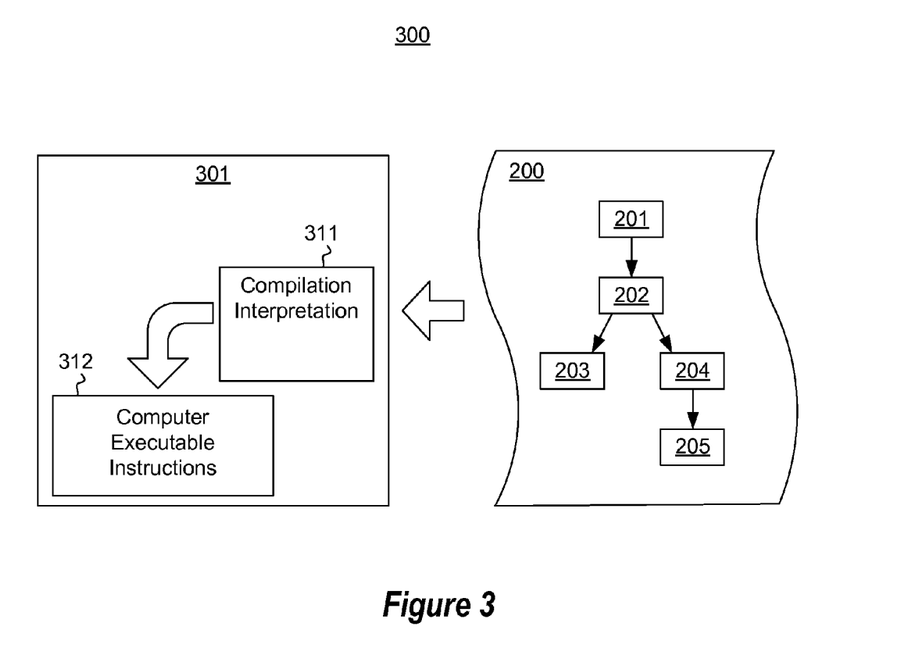
FIG. 3 abstractly illustrates the document of FIG. 2 being compiled and/or interpreted to thereby become computer-executable instructions.

FIG. 3 illustrates one example usage 300 of a hierarchically structured document. In this case, the hierarchically-structured document 200 is provided to a computing system 301, where the document 200 undergoes one or more stages of compilation and/or interpretation 311 to cause the computing system to formulate computer-executable instructions 312 that may be executed by the computing system. One example of a standard for formulating hierarchical descriptions of computer programs is eXtensible Application Markup Language (or XAML). XAML is a standard for drafting application descriptions in eXtensible Markup Language (or XML) such that the XML may be interpreted and an application formulated at run-time or prior to run-time. XML is a standard often used for drafting hierarchically structured documents, although the principles described herein are not limited to the viewing and/or editing of documents that are based on XML or XAML.

The following is an XAML document that will be provided as an example only. The example is provided by realizing that the principles described herein are not limited to any specific type or structure for the hierarchically structured document, but recognizing that an example can be helpful in understanding the broader principles described herein. The example XAML document is as follows with line numbering added for clarity:

```
1.  <Activity [Appropriate Namespace Descrations Inserted Herein]>
2.      <WorkflowViewStateService.ViewState>
3.          <Dictionary TypeArguments="String, Object">
4.              <Boolean Key="ShouldExpandAll">True</Boolean>
5.          </Dictionary>
6.      </WorkflowViewStateService.ViewState>
7.      <Sequence XamlDebuggerXmlReader.FileName= [Insert FileName]>
8.          <WorkflowViewStateService.ViewState>
9.              <Dictionary TypeArguments="String, Object">
10.                 <Boolean Key="IsExpanded">True</Boolean>
11.             </Dictionary>
12.         </WorkflowViewStateService.ViewState>
13.         <Parallel>
14.             <Delay/>
15.             <ForEach TypeArguments="x:Int32">
16.                 <WorkflowViewStateService.ViewState>
17.                     <Dictionary TypeArguments="String, Object">
18.                         <Boolean Key="IsExpanded">False</Boolean>
19.                         <Boolean Key="IsPinned">False</Boolean>
20.                     </Dictionary>
21.                 </WorkflowViewStateService.ViewState>
22.                 <ActivityAction TypeArguments="Int32">
23.                     <ActivityAction.Argument>
24.                         <DelegateInArgument TypeArguments="Int32" Name="item"
                              />
25.                     </ActivityAction.Argument>
26.                     <While />
27.                 </ActivityAction>
28.             </ForEach>
29.         </Parallel>
30.     </Sequence>
31. </Activity>
```

The document extends from lines 1 through 31. Lines 2 through 6 represent certain properties of the document. In particular, line 4 in this context indicates that the view of the document should expand all of the nodes upon opening. Thus, prior state regarding the expansion properties of the document as a whole are preserved within the document itself.

Lines 7 through 30 represent a sequence activity, and is an example of the node 201 of FIG. 2. Line 10 is once again a persisted expansion state, and indicates that this sequence should be expanded upon opening. The editor may change this setting at some point in response to user interaction with the editor.

The sequence activity contains a child parallel activity that extends from lines 13 through 29. The parallel activity is an example of the node 202 of FIG. 2, and will be interpreted to be the child of the sequence activity due to its nested position within the sequence activity.

The parallel activity includes a first child activity that is represented wholly at line 14. The delay activity represents an example of the node 203 of FIG. 2. This first activity is a delay activity and will be interpreted to be the child of the parallel activity due to its nested position within the parallel activity.

The parallel activity also includes a second child activity, a "For Each" activity that extends from lines 15 through 28. The For Each activity represents an example of the node 204 of FIG. 2, and will be interpreted to be the child of the parallel activity due to its nested position within the parallel activity. Line 18 represents that the current persistent expansion state of the For Each activity is collapsed.

The For Each activity includes a child while activity that is represented wholly at line 26. The while activity represents an example of the node 205 of FIG. 2. This while activity will be interpreted to be the child of the For Each activity due to its nested position within the For Each activity.

The viewer/editor described herein need not actually execute the hierarchical document 200, but does provide a view of the hierarchical document such that the document can be easily navigated through. A walkthrough of one example of the operation of the viewer/editor will be described with respect to FIGS. 4 through 12.

Figure 4:
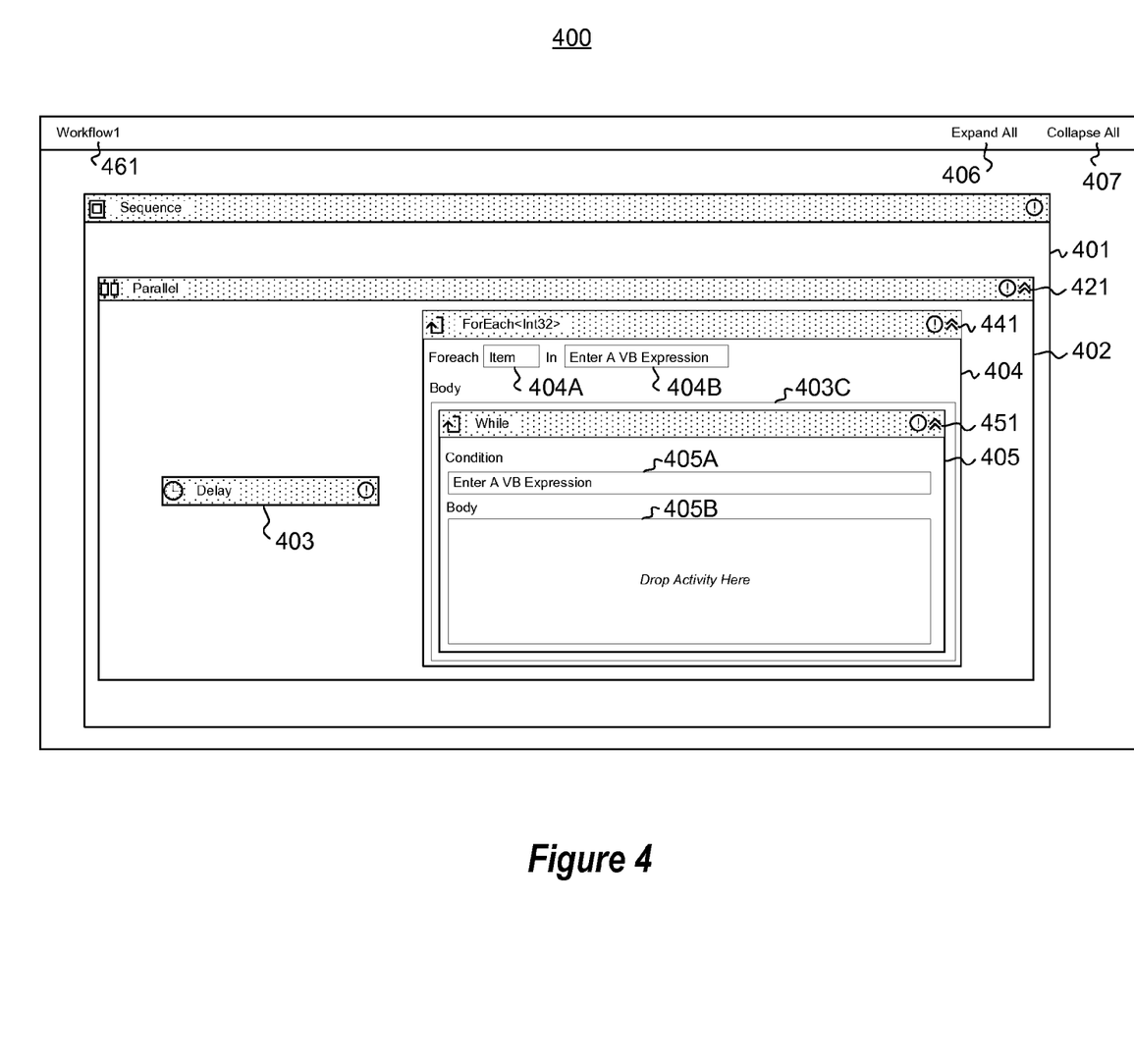
FIG. 4 illustrates a user interface that represents a beginning point in an example replacement that will be described herein.

FIG. 4 illustrates a user interface 400 that represents a beginning point in an example replacement that will be described herein. The user interface 400 illustrates the hierarchical document represented by the XAML document described above. In this case, each node in the hierarchical document (i.e., an activity in the document in this example) is represented by a window. For instance, a sequence window 401 represents the sequence activity. In this initial state, the visualization is completely expanded in that each window associated with each activity is viewable, along with all of the property fields of the activity.

The parallel window 402 represents the parallel activity. The fact that a node (in the example an activity) is a child of another node (also an activity in the example) is represented visually in this example by the window representing the child node being included within the window representing the parent node. Thus, the parallel window 402 is included within the sequence window 401, since the parallel activity is the child of the sequence activity. Populated or unpopulated properties of a particular node are presented also within the corresponding window that represents the node, but outside any window that represents a child node of that particular node. Thus, in FIG. 4, since there are no properties within sequence window that are not also in parallel window, there are no properties of the sequence activity represented.

The delay window 403 represents the delay activity of the XAML example. The delay window 403 does not contain any properties and thus is represented only as a small window.

The For Each window 404 represents the For Each activity of the XAML example. The For Each window 404 shows two properties 404A and 404B (unpopulated in both cases) of the For Each activity. Properties 404A and 404B are examples of the fields 204A and 204B of FIG. 2. The body field 403C may contain one or more activities. In this case the body field 403C includes a while window 405.

The while window 405 represents the while activity of the XAML example. The while window 405 shows two fields. One field 405A is an expression field into which an expression may be inserted which is the condition for continuing the while activity. Once the condition is false, the while activity finishes executing. A body field 405B is shown empty with a mere prompt that an activity may be dropped within the body field 405B to create a child activity of the while activity.

Figure 5:
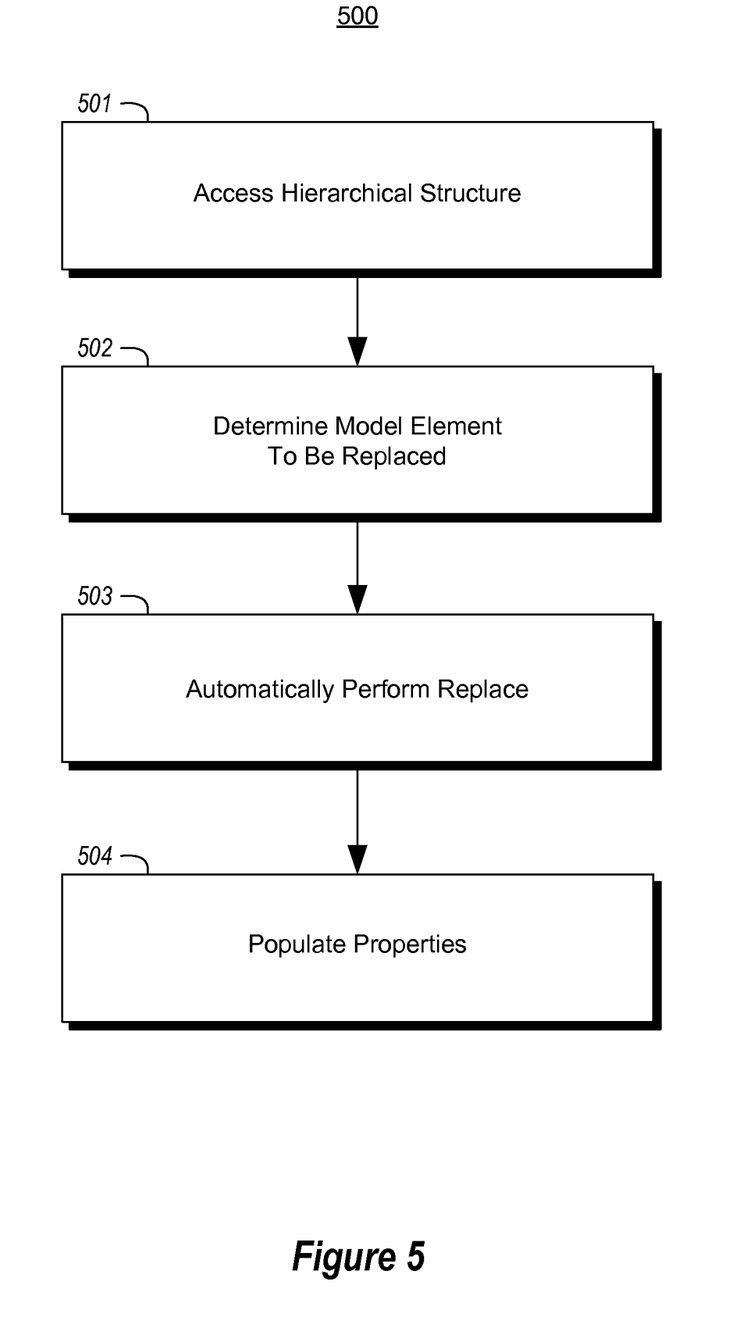
FIG. 5 illustrates a flowchart of a method for altering a hierarchical structure of multiple model elements constituting a computer program.

FIG. 5 illustrates a flowchart of a method 500 for altering a hierarchical structure of multiple model elements constituting a computer program. The method 500 may be performed by the computing system 100 in response to the execution, by the computing system, of one or more computer-executable instructions.

The method initiates by accessing a hierarchical structure of model elements (act 501). An example of such a hierarchical structure was provided above. The model elements may be, for example, components of a computer program. In the example above, the components of the computer program were activities in a workflow. However, even if the computer program contained activities, they may contain other types of model elements as well, such as, for example, a try-catch block which is a common C# model element.

For at least one of the model elements, the computing system determines that a model element of the hierarchical structure is to be replaced by another model element (act 502). Specifically, the model element of one particular model element type is to determined to be replaced by a model element of another particular model element type (act 502).

In response to this determination, the model element of the first model element type is replaced by the model element of a second model element type (act 503). This replace operation is completed while maintaining the ancestral relationship status of the model element within the hierarchical structure of model elements. In other words, the model element that replaced that prior model element retains the same position in the hierarchical structure as the prior model element had. In a final step, the properties of the replacing model element are populated (act 504).

The replacement operation may be behavior-based. In other words, the computing system determines that a model element should be replaced by another model element by monitoring usage of the computer program that is constructed from the hierarchical structure of model elements. If there is a change in usage that warrants a replacement from one model element to another, the computing system may automatically perform the replace operation.

As an example, suppose that one of the functions of a computer program is to send an e-mail. Now suppose there are three types of model elements that send e-mail, 1) a full e-mail model element that functions to send of e-mails with headings, a body, and with multiple attachments, 2) an intermediate e-mail model element that functions to send e-mails with headings, and a body, but no attachments, and 3) a simple e-mail model element that functions to send e-mails with headings and with a body, but with the size of the body limited to 128 characters, and without the ability to send attachments. The hierarchical structure of model elements may first operate using the full e-mail model element that permits attachments to be sent. However, the computer program may detect that the user never really sends e-mails with attachments. In fact, the computer program only ever needs to send e-mails with a short body. In that case, the computing system may replace the full e-mail model element with the simple e-mail model element. Then, should the behavior change further in the future, the model element may yet be replaced again as needed. This occasional replacement operation may be performed for other model elements as well, where there are alternative model elements available. In this way, the computer program may be kept as simple as the behavior of the program warrants, while becoming more complex as behaviors change.

The replacement may alternatively be initiated by the user, through one or more gestures made in a viewer in which is displayed a hierarchical visualization of multiple model elements in the hierarchical structure of model elements. An example of such a viewer has been illustrated in FIG. 4 with respect to the example XAML document that includes four model elements.

In the case of a gesture-based replacement, the computing system determines that the model element should be changed in response to one or more user gestures interfacing with the viewer in a manner to convey user intent to perform the replacement. For instance, in FIG. 4, suppose that the user desires to replace the For Each activity 404 with another type of activity, perhaps a sequence activity. In this case, the user might select the For Each activity 404, right click to present a list of options, select an option to replace the activity, then select a sequence activity template. Then, based on these simple gestures, a sequence activity window might appear in the same position as the For Each activity window 404. In this case, the while activity window 405 might disappear. Underlying this window replacement, the computing system actually changes the model element itself, in this case, the activity is replaced in the underlying XAML, of course, while preserving position of the activity within the ancestral chain of the hierarchical structure.

As another example, suppose that the user wants to replace the For Each activity with a Try-Catch block that contains the For Each activity. A Try-Catch block is not an activity, but is a model element that can be included within a workflow. The try-catch block includes try block that contains code to be executed, and which is protected by exception handling, and a catch block that contains the exception code to be executed should the code in the try block fail. Referring to FIG. 4, the user might, in that case, again select the For Each activity window 404, and then right click and select a replace operation. Now, the user selects a Try-Catch block.

In this case, the try-catch block window then replaces the For Each activity window 404 within the hierarchical visualization, with the computing system enforcing a corresponding replacement in the underlying hierarchical structure of model elements. In this case, however, some of the fields of the try-catch block may be populated (reference act 504 of FIG. 5). For instance, when a replace operation is performed, some of the fields may be automatically populated based on the identity of the replaced model element type and/or based on the identity of the replacing model element type. In the case of a try-catch block replacing another model element, the try field of the try-catch block are populated by the same model element that the try-catch block replaced, with all of the descendent chains of the old model element preserved. Referring to FIG. 4, the result would be that a try-catch block window replaces the For Each Window 404. However, the For Each window 404 is then contained within the try-catch block window. The For Each Window 404 still contains the While window 405 since the descendent chains are preserved. The computing system enforces corresponding changes in the underlying model elements.

Note that these changes can be easily made by the user without having to first delete the prior model element, then manually add a new model element and insert the new model element into the hierarchic structure. Instead, the model element to be replaced is selected, then a simple user gesture is performed indicative of a user intent to replace. Then, the replacement model element type is selected. The new model element automatically takes the same position as the prior selected model element. Thus, there is no separate gesture required to delete the model element, and there is no separate gesture required to add the new model element. The two functions are integrated in a single replace gesture.

Figure 6:
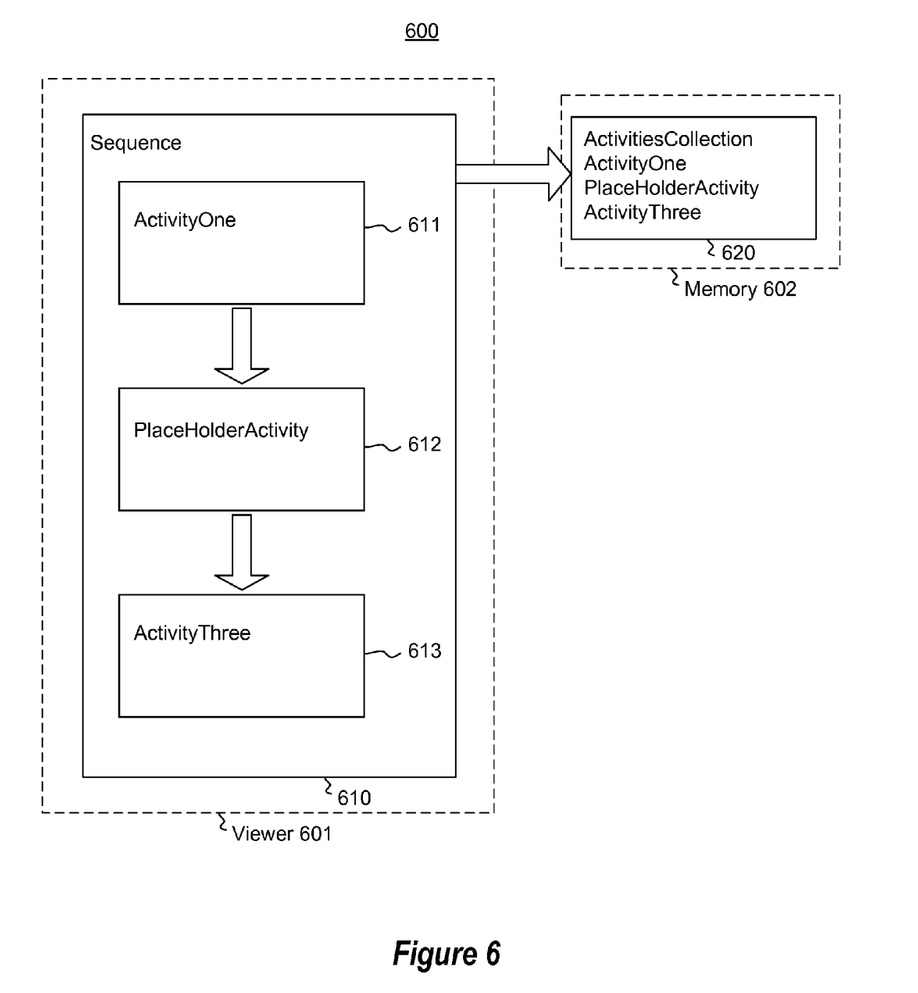
FIG. 6 illustrates an environment in which the placeholder model element is used within a sequence model element.
Figure 7:
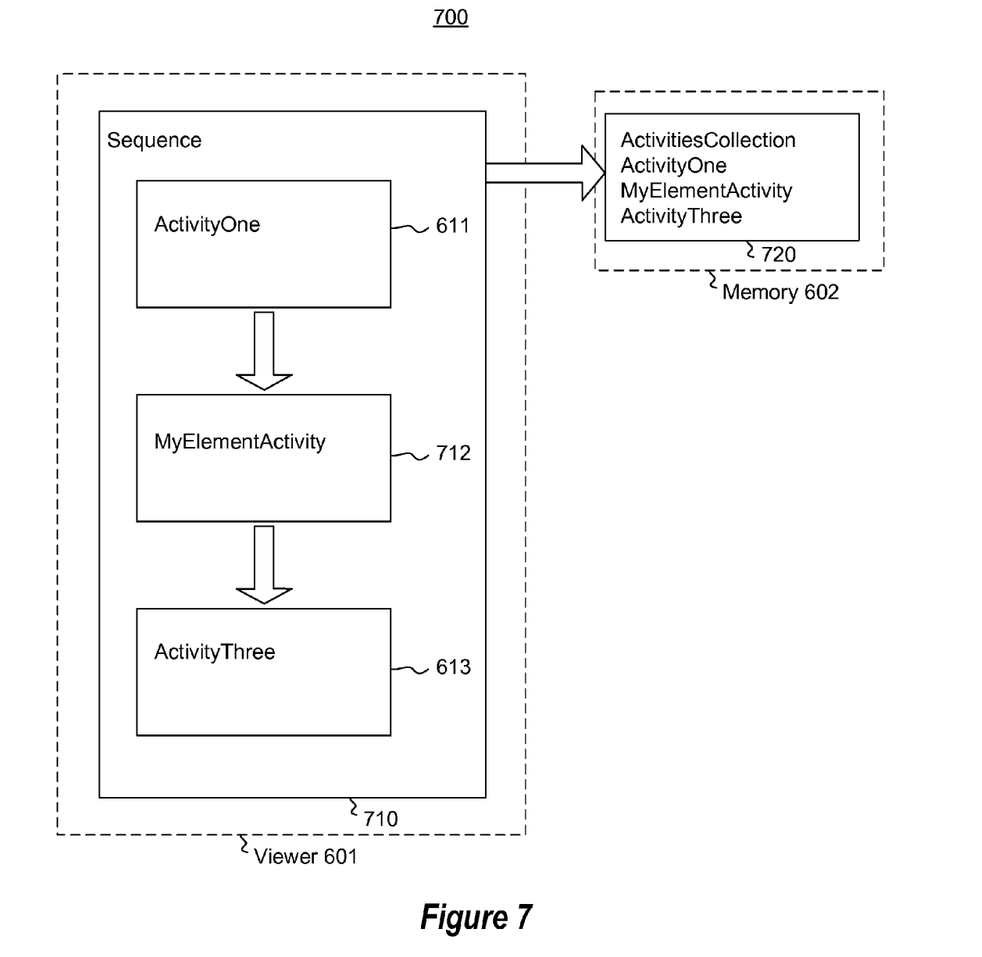
FIG. 7 illustrates an environment in which the placeholder model element is replaced with another model element.

The principles described herein also allow the user of a simple placeholder model element to be used in the hierarchical structure during the authoring process. The placeholder model element may be used when the author is not quite sure yet what kind of model element to use at a particular position within the hierarchy, but the author knows that some type of model element will be used at that position. In such cases, the placeholder model element may be deposited in the visualization, with the computing system enforcing a corresponding placeholder model element within the model element hierarchy. Then, regardless of how entangled the placeholder model element is within the hierarchical structure, the replace operation may be used to replace the placeholder element within the hierarchy of model elements. FIG. 6 illustrates an environment 600 in which the placeholder model element is used within a sequence model element. FIG. 7 illustrates an environment 700 in which the placeholder model element is replaced with another model element.

Referring to FIG. 6, the initial environment includes a viewer 601 that is providing a visualization of an underlying activities collection 620 present in memory 602. The collection 620 includes a sequence activity that includes three activities in sequence including 1) ActivityOne, 2) PlaceHolderActivity, and 3) ActivityThree. The viewer thus includes a visualization 610 of the sequence activity, a visualization 611 of the Activity One, a visualization 612 of the PlaceHolder Activity, and a visualization 613 of Activity Three.

Once the author has a better idea of the type of model element that is to replace the PlaceHolder Activity, the author may simply select the placeholder activity visualization 612, indicate that a replacement is to be made, and select the replacement model element (in this case, the MyElementActivity). The result is shown in FIG. 7, which illustrates an environment in which the sequence visualization 710 has been modified from the prior sequence visualization 610 to replace the PlaceHolder Activity visualization 612 with the MyElement Activity visualization 712. The computing system enforces a change to the activity collection in memory 602 to change the references to the PlaceHolderActivity to properly refer to the myElementActivity 720.

In one embodiment, when a particular model element is selected for replacement, the computing system may replace all of the model elements of that type with model elements of the replacement type, either by default, or at the selection of the author.

Recall that the try-catch block replacement replaces the prior selected model element with a try-catch block, and reinserts the replaced model element as a child model element of the try-catch block, preserving any descendent model elements of the replaced model element. A similar example is the replacement of portion of the hierarchical model elements with a refactored activity.

The refactored activity retains all of the functionality of the replaced portion of the hierarchical model elements, but allows the visualization to be simplified. A refactored activity is really just a container. When a particular portion of the hierarchy is replaced by a refactored activity, the refactored activity (i.e., a container) replaces the portion of the hierarchy. In order to allow the refactored activity to retain the same functionality as the portion replaced, the portion replaced then becomes a child of the refactored activity, wherein the portion retains the same hierarchical form that it possessed prior to the replacement. In order to allow for the benefit of a simplified visualization, the visualizations for the replaced portion may be hidden in the visualization itself. Thus, refactorization creates a new model element with a simple visualization, while retaining the same functionality as the replaced portion of the hierarchy.

Referring back to FIG. 5, recall that once a model element is replaced by another model element, the replacement model element has fields that are then populated. Some model elements may not have any fields to populate at all. In that case, act 504 of FIG. 4 is not performed. However, in cases in which there are property fields to be populated, there may be one or more mechanisms used to populate the fields.

In some cases, population might be performed based on context of the replaced model element and the replacement model element. For example, if a portion of the hierarchy is replaced by a try-catch block, the try field of the try-catch block is populated by that portion of the hierarchy that was replaced by the try-catch block. Similarly, the refactored activity has a body field that is populated by the portion of the hierarchy that was replaced by the refactored activity.

Likewise, other fields may be populated based on context. For instance, the value of the DateTime field of one model element may be used to populate a DateTime field of a replacement model element. Some transformation modules may be available to assist when the value of a field of the replaced model element cannot be copied directly into the field of the replacement model element. There may be a collection of transformation modules available to perform such transformations. An API may be provided to extend the availability of such transformation modules, as well as to author new custom model elements.

Figure 8:
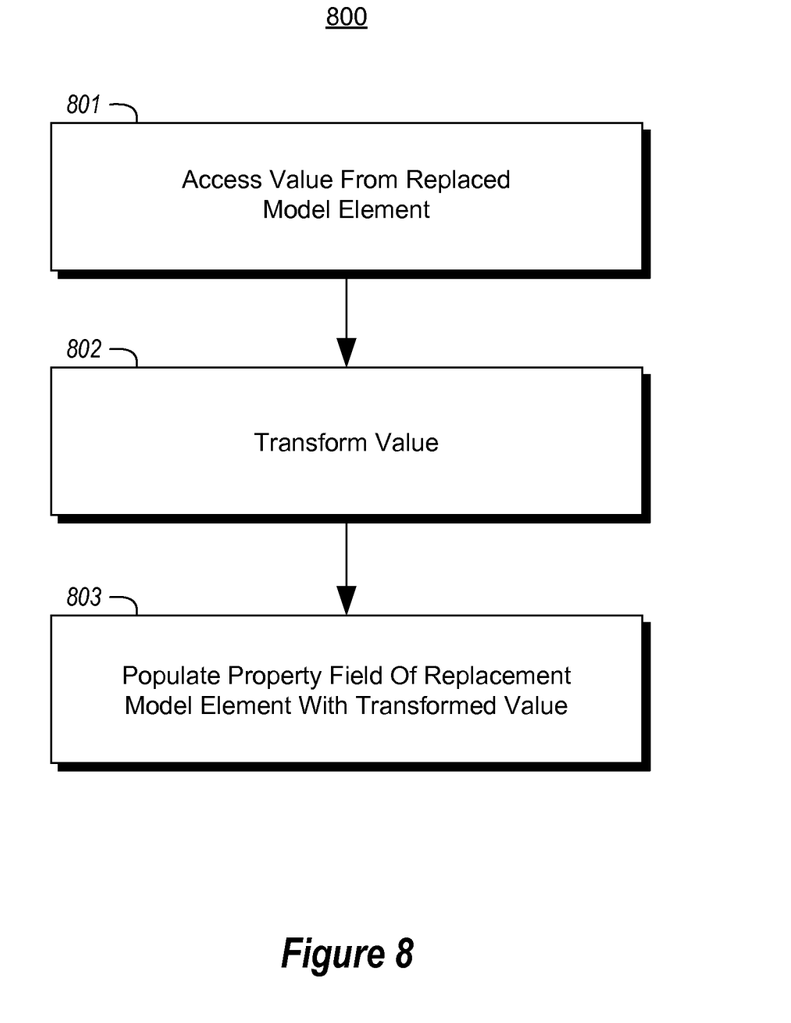
FIG. 8 illustrates a flowchart of a method for automatically populating a property value in a case where transformation is used.

FIG. 8 illustrates a flowchart of a method 800 for automatically populating a property value in a case where transformation is used. The property value of the replaced model element is accessed (act 801) and then transformed (act 802). The transformed value is then used to populate the property field of the replacement model element (act 803).

The principles described herein thus provide an efficient mechanism for replacing model element with other model elements in a hierarchical structure of model elements. The replacement may be behavior-based in response to usage changes in a computer program. The replacement may also be in response to author gestures, and without requiring separate gestures to delete an element, add an element, and insert the element into the hierarchical structure.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more physical computer-readable hardware storage devices having stored thereon computer-executable instructions that, when executed by one or more processors of a computing system, cause the computing system to perform the following:

an act of accessing a hierarchical structure of model elements, each element having an ancestral relationship status defined by the position of the each element in the hierarchical structure and parent-child associations of the each element and one or more other elements;

for at least one of the model elements, an act of determining that the at least one model element should be changed from a first model element type to a second model element type, determining being at least in part behavior-based and based upon monitoring usage of the model elements;

in response to the determination, an act of automatically changing the at least one model element from a first model element type to a second model element type and maintaining the ancestral relationship status of the changed at least one model element within the hierarchical structure of model elements such that the position in the hierarchical structure and parent-child associations of the at least one of the model elements are preserved for the changed at least one model element.

2. The computer program product in accordance with claim 1, wherein the model elements are components of a computer program.

3. The computer program product in accordance with claim 2, wherein the act of changing the model element from the first model element type to the second model element type occurs in response to a change in usage of the computer program.

4. The computer program product in accordance with claim 2, wherein the model elements are activities within a workflow.

5. The computer program product in accordance with claim 1, wherein the computer-executable instructions are further structured such that the computing system further performs the following:

an act of displaying a hierarchical visualization of multiple model elements in the hierarchical structure of model elements in a viewer, the hierarchical visualization including a visualization for each of the multiple model elements.

6. The computer program product in accordance with claim 5, wherein the act of determining that the model element should be changed comprises an act of detecting that a user has interfaced with the viewer with one or more gestures indicative of a user intent to perform the change.

7. The computer program product in accordance with claim 6, wherein the one or more gestures do not include a separate gesture for deleting the model element of the first model element type and a separate gesture for adding the model element of the second model element type.

8. The computer program product in accordance with claim 6, wherein the one or more gestures is a single gesture.

9. The computer program product in accordance with claim 6, wherein the one or more gestures is a single gesture once the model element of the first model element type is selected.

10. The computer program product in accordance with claim 5, wherein the model element of the first model element type is a placeholder model element that is not executable.

11. The computer program product in accordance with claim 5, wherein the model element of the first model element type is a collection of model elements, and the model element of the second model element type is a refactored activity.

12. The computer program product in accordance with claim 1, wherein the model element of the second model element type includes one or more property fields, wherein the computer-executable instructions are further structured such that the computing system further performs an act of automatically populating at least one of the one or more property fields based on property values of the model element of the first model element type.

13. The computer program product in accordance with claim 12, wherein the act of automatically populating comprises an act of copying a property value of the at least one model element of the first model element type into a property filed of the model element of the second model element type.

14. The computer program product in accordance with claim 12, wherein the act of automatically populating comprises the following:

an act of access a property value of the model element of the first model element type;

an act of transforming the property value of the model element of the first model element type into a different property value; and an act of providing the transformed property value into a property field of the Model element of the second model element type.

15. The computer program product in accordance with claim 14, wherein the act of transforming the property value comprises changing a type of the property value.

16. A computer-implemented method for altering a hierarchical structure of multiple model elements that constitute a computer program, the method comprising:

of a computing system accessing the hierarchical structure of model elements; each element having an ancestral relationship status defined by the position of each model element in the hierarchical structure and parent-child associations of the each element and one or more other elements;

the computing system determining that a first model element of the hierarchical structure is to be replaced, determining being at least in part behavior-based and based upon monitoring usage of the model elements;

in response to the determination, an act of the computing system automatically replacing the first model element of with another model element that retains the same ancestral relationship status and position within the hierarchical structure and parent-child associations of the another model element is the same as the replaced first model element; and in response to replacing the first model element, automatically populating a property value of the another model element with an associated property value from the replaced first model element.

17. The method in accordance with claim 16, wherein determining that the first model element is to be replaced is performed by monitoring usage of the computer program and making the determination based on a change in usage of the computer program.

18. The method in accordance with claim 16, further comprising:

displaying a hierarchical visualization of multiple model elements in the hierarchical structure of model elements in a viewer, the hierarchical visualization including a visualization for each of the multiple model elements, the multiple model elements including at least some the model elements in the hierarchical structure, wherein determining that the first model element is to be replaced comprises an act of detecting that a user has interfaced with the viewer with one or more gestures indicative of a user intent to perform the replace.

19. The method in accordance with claim 18, wherein the one or more gestures are performed without deleting the model element of the first model element type and without a separate gesture for adding the model element of the second model element type.

20. A computer program product comprising one or more physical computer-readable hardware storage devices having stored thereon computer-executable instructions that, when executed by one or more processors of a computing system, cause the computing system to perform the following:

displaying a hierarchical structure of model elements that constitute a computer program in a viewer, the hierarchical visualization comprising simultaneously displaying in the viewer a plurality of windows, each displayed in a hierarchical manner that corresponds to the hierarchical structure of the displayed model elements;

for at least one of the displayed model elements of the hierarchical structure, determining that the at least one model element should be changed from a first model element type to a second model element type in response to one or more user gestures made in the window of the at least one displayed model element and upon monitoring usage of the model elements; and     in response to the determination, changing in the viewer window for the at least one displayed model element from a first model element type to a second model element type without requiring a user gesture to delete the at least one model element from the hierarchical structure and while maintaining an ancestral relationship status of the at least one displayed model element within the hierarchical structure of model elements such that the position in the hierarchical structure and each parent-child association of the displayed model element of a first model element type are preserved for the displayed model element when changed to the second model element type.

\* \* \* \* \*